United States Patent [19]

Lowe et al.

[11] Patent Number: 4,931,650
[45] Date of Patent: Jun. 5, 1990

[54] X-RAY DETECTORS

[75] Inventors: Barrie G. Lowe; Stuart G. J. Tyrrell, both of High Wycombe, England

[73] Assignee: Link Analytical Limited, High Wycombe, England

[21] Appl. No.: 221,998

[22] Filed: Jul. 20, 1988

[30] Foreign Application Priority Data

Aug. 5, 1987 [GB] United Kingdom ............... 8718531

[51] Int. Cl.⁵ .......................................... H01J 37/244
[52] U.S. Cl. .............................. 250/397; 250/370.15; 357/83; 62/51.1; 62/55.5
[58] Field of Search ........................... 250/397, 370.15; 357/83; 62/514 R, 55.5, 51.1

[56] References Cited

U.S. PATENT DOCUMENTS

| 3,864,570 | 2/1975 | Zingaro | 250/310 |
| 4,707,998 | 11/1987 | Linner et al. | 62/55.5 |

OTHER PUBLICATIONS

Wirmark, G., et al., "Characterisation of Si (Li) X-Ray Detector Efficiencies in the Low Energy Range", presented at the 11th International Congress on Electron Microscopy, Aug. 1986.
Fiori, C. E. et al., Operation of Energy-Dispersive X-Ray Spectrometers in the Analytical Electron Microscope, Analytical Electron Microscopy, 1981, Geiss, R. H., Ed.
Link Analytical Brochure entitled "High Performance Detector Technology", designated DT/688/10M.

Primary Examiner—Jack I. Berman
Attorney, Agent, or Firm—Cooper & Dunham

[57] ABSTRACT

A technique for conditioning X-ray detectors which are introduced into electron microscopes and maintained at an operating temperature substantially below ambient is disclosed. Localized heating is applied to the detector by, for example, electrical resistance heating, whereby the detector is conditioned for about an hour without the heat sink being removed.

8 Claims, 2 Drawing Sheets

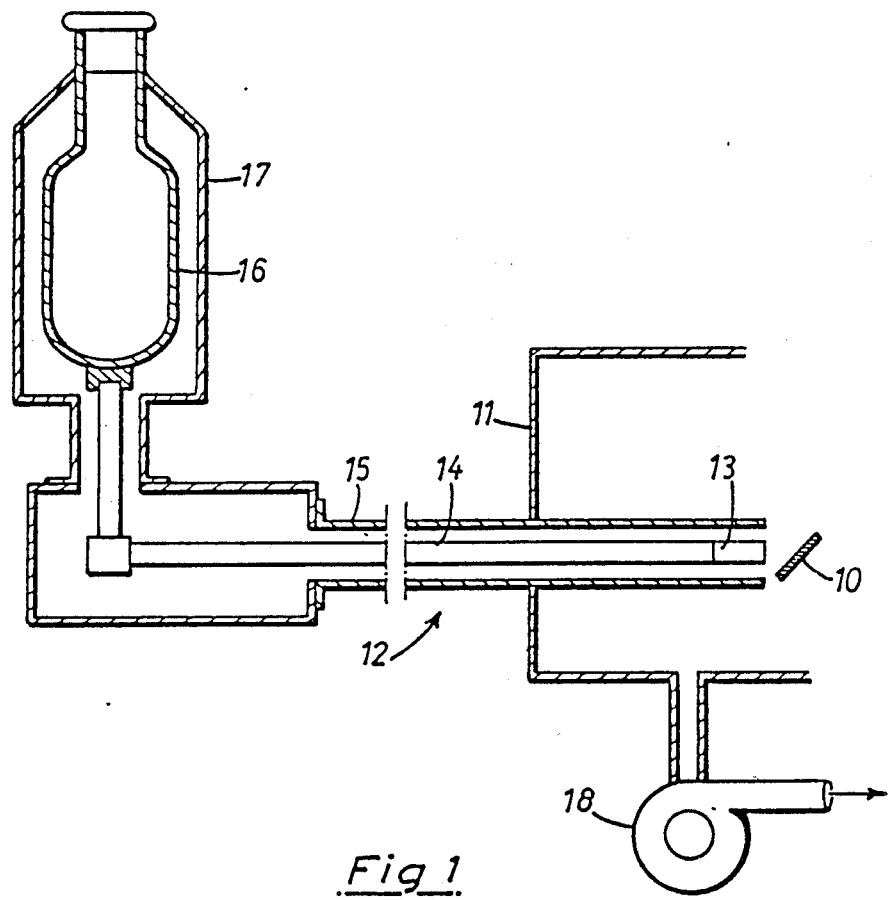
Fig_1
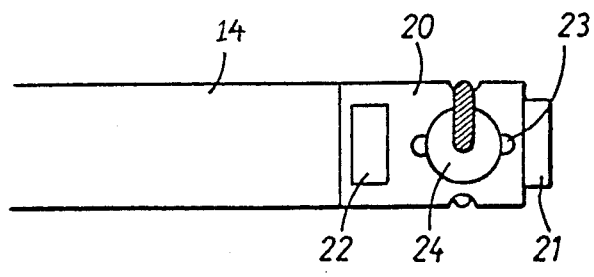
Fig_2

X-RAY DETECTORS

TECHNICAL FIELD OF THE INVENTION

The present invention relates to X-ray detector systems for electron microscopes.

DESCRIPTION OF THE PRIOR ART

X-ray detectors are arranged to examine X-rays produced by the bombardment of electrons onto a specimen. Analysis of the X-rays, particularly with respect to their frequency, provides an operator with information relating to the elemental composition of the specimen in addition to structural information provided by the microscope.

Known detectors have a semiconductor (such as a lithium drifted silicon crystal) mounted at the end of a probe which is introduced into the microscope close to the specimen. X-rays impinging on the crystal create a small charge therein which, after several stages of amplification, is processed to generate composition data. A block supporting the detector is mounted on a cold finger which is in turn connected to a flask of liquid nitrogen for maintaining the detector at an operating temperature of about minus one hundred and eighty degrees celsius. The cold finger is surrounded by an envelope and a vacuum is maintained between the finger and the envelope.

A problem with X-ray detectors is that they are very sensitive to contamination. The problems associated with contamination due to the build up of ice ($H_2O$) is identified by G. Wirmark, G. Wahlberg and H. Norden in their paper "Characterisation of Si (Li) X-ray detector efficiencies in the low energy range" presented at the 11th International Congress on Electron Microscopy in August 1986. A known solution to the problem of ice build up is identified by F. Richle, E. Tegeler and B. Wende in their paper "Spectral efficiency and Resolution of Si (Li) detectors for photon energies between 0.3 KeV and 5 KeV". S.P.I.E. Berlin, 1986. Here it is stated that performance of the detector can be recovered by a warming up procedure.

Vacuum flasks are commercially available which contain surfaces known as 'molecular sieves' which absorb water vapour to reduce ice build up on sensitive areas. However such systems are designed to be maintained at the operating temperature of the detector (minus 180 degrees celsius) therefore the vessel must be kept topped up with liquid nitrogen even when the device is not in use. Thus with sealed detectors, having beryllium windows, a warming up procedure involves pumping the detector to maintain a vacuum while removing water vapour as it evaporates. Such a procedure is usually only undertaken as part of a major overhaul involving the return of the detector to the manufacturer. For windowless detectors a warming up procedure may involve using the pumping system of the microscope.

Heating up the detector not only removes ice from the detector crystal itself but also removes contaminants from other components which, when present, generate noise. Another significant advantage is that it anneals out radiation damage of the crystal. However problems with known procedures are that they are time consuming, hence expensive, and may cause contaminating material to be transferred from the detector to the microscope, or vice versa.

SUMMARY OF THE INVENTION

It is therefore an object of the present invention to provide an improved system for treating a detector.

According to a first aspect of the invention there is provided a detector system comprising a cold finger having a first end coupled to a heat sink at a temperature substantially below ambient temperature, an X-ray detector mounted at an opposite end of the cold finger wherein heat is transferred along the cold finger to maintain the temperature of the detector substantially below ambient temperature during normal operation, an envelope surrounding the cold finger wherein a vacuum is maintained between the cold finger and said envelope; and conditioning means for locally increasing the temperature of the detector for a predetermined interval while maintaining the heat sink substantially at the operating temperature.

BRIEF DESCRIPTION OF THE DRAWINGS

FIG. 1 shows an X-ray detection system including a detector assembly positioned within an electron microscope;

FIG. 2 details the detector assembly shown in FIG. 1;

DESCRIPTION OF THE PREFERRED EMBODIMENTS

Figure 3:
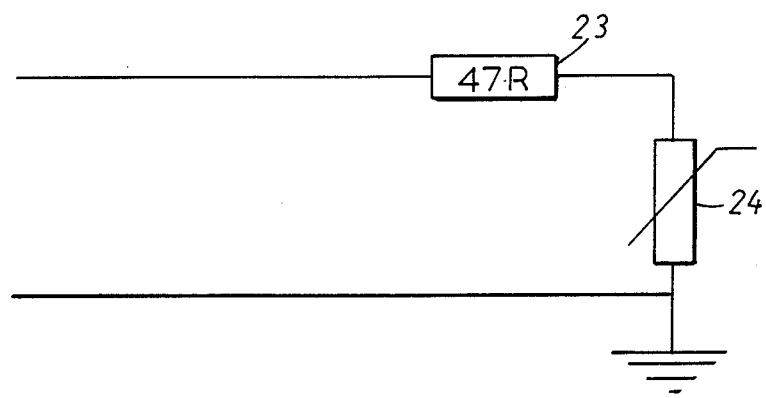
FIG. 3 shows a circuit for effecting conditioning of a detector mounted on the assembly shown in FIG. 2; and, FIG. 4 shows a typical temperature curve for the detector assembly detailed in FIG. 2.

An X-ray detector system connected to an electron microscope is shown in FIG. 1. A specimen 10 is supported within a microscope housing 11 forming an enclosure which in maintained under vacuum during operation. A detector probe 12 enters the housing so that a detector assembly 13 receives X-rays from the specimen during electron bombardment. The detector assembly 13 is mounted on a cold finger 14 surrounded by an envelope 15. The cold finger 14 is connected to a vessel 16 containing liquid nitrogen at a temperature of about minus one hundred and eighty degrees Celsius. The vessel 16 is surrounded by a flask 17 and a vacuum is maintained within said flask and the envelope 15.

The detector shown in FIG. 1 is a window-less detector allowing X-rays to pass from the specimen to the detector with no solid window inbetween. The vacuum within the envelope 15 and flask 17 is maintained by a pumping system 18 which forms part of the microscope. In sealed beryllium-window detectors the cold surfaces create a cryopump to provide a vacuum and remove water vapour.

The detector assembly 13 is shown in FIG. 2. A mounting block 20 of aluminium is connected to the cold finger 14 and a lithium drifted silicon detector 21 is secured to the opposite end of said block. A field effect transistor (FET) 22 is mounted on the block which provides a buffer amplifier for the output from the detector.

The assembly shown in FIG. 2 is a first embodiment of the invention in which the means for locally increasing the temperature of the detector is an electrical resistor 23 sealed to the mounting block 20. The resistor 23, a 47 ohm one quarter watt metal film resistor, and a serially connected polyswitch 24 (type PDS.21252 supplied by RAYCHEM) are cemented onto the block using silver-loaded epoxy cement. The epoxy is cured after application and then sealed to provide additional strength.

Figure 4:
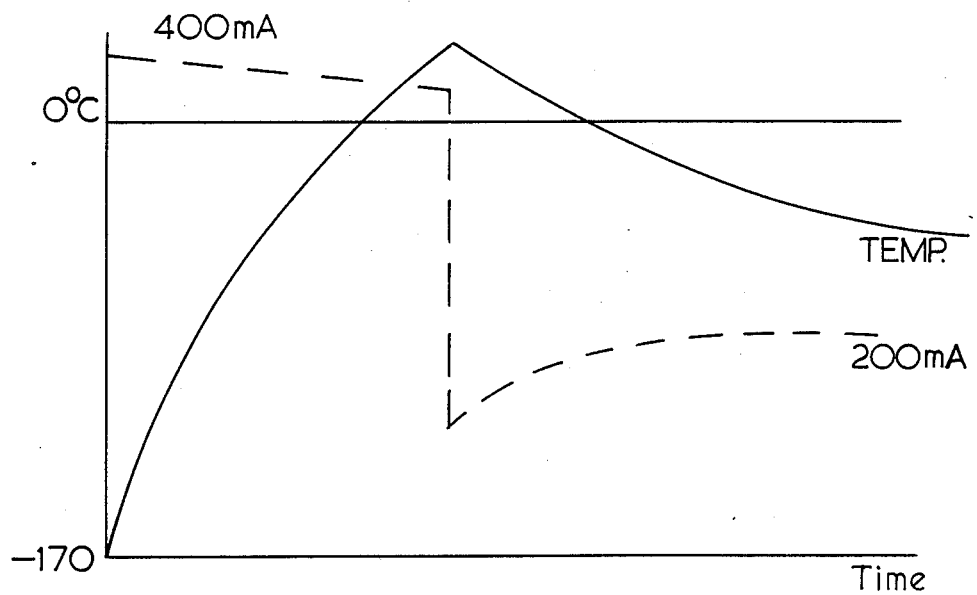

A circuit for effecting conditioning of the detector is shown in FIG. 3 and a typical response curve is shown in FIG. 4. On initiating a conditioning cycle the polyswitch 24 allows four hundred milli-amp (mA) to pass through the resistor which in turn dissipates heat to the block 20. However on reaching plus ten degrees celsius the polyswitch operates to increase the resistance in the circuit and hence reduce the heating current to two hundred mA. The block then cools until equilibrium is reached at about minus ten degrees celsius. This temperature is maintained for up to one hour until the detector is fully conditioned.

In a complete detection system the conditioning circuit is included as part of the main control circuit. On operating a "condition detector" switch the system is placed into a "condition detector" mode. A high voltage supply to the detector, required for normal operation, is removed and the condition cycle, as detailed above, is initiated. Once temperature equilibrium has been reached conditioning continues for a predetermined interval, say one hour. After this interval the heating current is removed and on reaching the operating temperature the high voltage to the detector is restored and an operator is notified, by means of a suitable display, that the detector has returned to its normal operational mode. It can therefore be seen that a detection system embodying the present invention may effect a conditioning cycle over a weekend, evening or even a lunch break. Furthermore experiments have shown that the detector is not damaged in any way by the conditioning process.

As an alternative to providing a heating resistor other forms of heating are possible. Thus heating may be effected by directing a high intensity light source onto the detector from a laser. In another embodiment the probe includes a removeable link which, to effect conditioning, disconnects the detection assembly from the cold vessel. Heating is then achieved by transfer from outside the system until the required temperature has been attained.

What we claim is:

1. A detector system comprising a cold finger having a first end coupled to a heat sink at a temperature substantially below ambient temperature, an X-ray detector mounted at an opposite end of the cold finger, wherein heat is transferred along the cold finger to maintain the temperature of the x-ray detector substantially below ambient temperature during normal operation, an envelope surrounding the cold finger, wherein a vacuum is maintained between the cold finger and said envelope; and conditioning means for locally increasing the temperature of the x-ray detector for a predetermined interval while maintaining the heat sink substantially at the operating temperature and maintaining a physical link, in the form of said cold finger, between said heat sink and said detector.

2. A detector system as in claim 1, wherein heat is applied to the detector by means of an electrical resistance heater.

3. A detector system as in claim 2, including a temperature sensitive device controlling the electrical power applied to said resistance heater to keep the temperature of the detector from exceeding a predetermined value.

4. A detector system as in claim 1, wherein the heat sink comprises a vessel containing liquid nitrogen surrounded by an evacuated flask.

5. A detector system as in claim 1, wherein a molecular sieve for absorbing water molecules is positioned between the vessel and the flask.

6. A method of conditioning an X-ray detector, wherein said detector is mounted on the end of a probe for introduction into an electron microscope and is maintained at an operating temperature substantially below ambient temperature during normal operation, comprising the steps of removing an operating bias voltage from the detector, increasing the temperature of the detector by localized heating to a predetermined conditioning value, while maintaining a physical, heat-conducting connection between said detector and a heat sink, holding the detector at the conditioning temperature for a predetermined interval, removing the localized heat and re-establishing the operating bias voltage when the detector has been cooled to its operating temperature.

7. A method as in claim 6, wherein electrical power is applied to a resistor to effect said localized heating of the detector.

8. An electron microscope comprising:
a housing and a vacuum system for maintaining the interior of said housing at a pressure less than that of the ambient;
a cold finger made of a heat conducting material and having a detector end and a far end, said detector end extending into said housing, an x-ray detector mounted on said detector end of the cold finger such that heat can be transferred between said cold finger and said x-ray detector, and a cooling system for cooling said far end of the cold finger;
a local heating device coupled with said x-ray detector to selectively transfer heat thereto; and
a control system coupled with said local heating device to selectively energize said device and thereby cause the device to transfer heat to said x-ray detector at a rate sufficient to locally raise the temperature of said x-ray device despite the transfer of heat from the x-ray detector to the cold finger and through the cold finger to the cooling system, for a conditioning cycle of a duration sufficient to condition the x-ray detector while said x-ray detector remains in its place in the electron microscope, and is physically connected to said cooling system through said cold finger.

* * * * *